(12) United States Patent
Schorn et al.

(10) Patent No.: US 11,301,749 B2
(45) Date of Patent: Apr. 12, 2022

(54) METHOD FOR CALCULATING AN OUTPUT OF A NEURAL NETWORK

(71) Applicant: Robert Bosch GmbH, Stuttgart (DE)

(72) Inventors: Christoph Schorn, Leonberg (DE); Sebastian Vogel, Schaidt (DE)

(73) Assignee: Robert Bosch GmbH, Stuttgart (DE)

( * ) Notice: Subject to any disclaimer, the term of this patent is extended or adjusted under 35 U.S.C. 154(b) by 422 days.

(21) Appl. No.: 16/348,401

(22) PCT Filed: Nov. 8, 2017

(86) PCT No.: PCT/EP2017/078621
§ 371 (c)(1),
(2) Date: May 8, 2019

(87) PCT Pub. No.: WO2018/091333
PCT Pub. Date: May 24, 2018

(65) Prior Publication Data
US 2019/0266476 A1 Aug. 29, 2019

(30) Foreign Application Priority Data
Nov. 18, 2016 (DE) .......................... 102016222814.5

(51) Int. Cl.
*G06N 3/04* (2006.01)
*G05B 13/02* (2006.01)
*G06N 3/063* (2006.01)

(52) U.S. Cl.
CPC ......... *G06N 3/0454* (2013.01); *G05B 13/027* (2013.01); *G06N 3/0472* (2013.01); *G06N 3/063* (2013.01)

(58) Field of Classification Search
CPC .... G06N 3/0454; G06N 3/0472; G06N 3/063; G05B 13/027
(Continued)

(56) References Cited

U.S. PATENT DOCUMENTS 4,918,618 A * 4/1990 Tomlinson, Jr. ......... G06N 3/08
706/25
5,926,804 A 7/1999 Tufts et al.
(Continued)

FOREIGN PATENT DOCUMENTS

DE 4404974 C1 7/1995
DE 10317384 A1 2/2004

OTHER PUBLICATIONS

International Search Report for PCT/EP2017/078621, dated Feb. 16, 2018.
(Continued)

*Primary Examiner* — Michael J Huntley
*Assistant Examiner* — Oluwatosin O Alabi
(74) *Attorney, Agent, or Firm* — Norton Rose Fulbright US LLP; Gerard Messina

(57) ABSTRACT

A method for calculating an output of a neural network, including the steps of generating a first neural network that includes discrete edge weights from a neural network that includes precise edge weights by stochastic rounding; of generating a second neural network that includes discrete edge weights from the neural network that includes precise edge weights by stochastic rounding; and of calculating an output by adding together the output of the first neural network and of the second neural network.

13 Claims, 5 Drawing Sheets

(58) Field of Classification Search
USPC .......................................................... 706/31
See application file for complete search history.

(56) References Cited

U.S. PATENT DOCUMENTS

| | | | |
|---|---|---|---|
| 6,064,997 A | 5/2000 | Jagannathan et al. | |
| 2017/0103305 A1* | 4/2017 | Henry | G06N 3/063 |
| 2017/0169346 A1* | 6/2017 | Rinkus | G06N 3/0472 |
| 2018/0121796 A1* | 5/2018 | Deisher | G06N 3/0472 |
| 2020/0090278 A1* | 3/2020 | Christensen | G06Q 40/04 |

OTHER PUBLICATIONS

Alaghi, Armin et al., "Survey of Stochastic Computing", In: ACM Trans Embed. Comput. Syst, vol. 12, No. 2s, Article 92, ISSN 1539-908, http:I/doi.acm.org/10.1145/2465787.2465794.

Courbariaux, Matthieu et al., "BinaryConnect: training deep neural networks with binary weights during propagations", In: Advances in neural information processing systems 28 :29th Annual conference on neural Information processing systems 2015. vol. 4, 2015, pp. 1-9. XP055447419.

Sebastian Vogel et al., "Efficient Stochastic Inference of Bitewise Deep Neural Networks", arxiv.org, Cornell University Library, 201 Olin Library Cornell University Ithaca, NY, 14853, 20, 2016, pp. 1-6. XP080733355.

Suyog Gupta et al.,"Deep Learning with Limited Numerical Precision", arxiv.org, Cornell University Thaca, NY 14853, 2015, pp. 1-10. XP080677454.

Brown, et al.: "Stochastic Neural Computation I: Computational Elements", IEEE Transactions on Computers, 50 (9), (2001), pp. 891-905.

Hwang and Sung: "Fixed-Point Feedforward Deep Neural Network Design Using Weights +1, 0, and −1", 2014 IEEE Workshop on Signal Processing Systems (SIPS), pp. 1-6.

Khan and Hines: "Integer-weight neural nets", Electronics Letters 30 (15), (1994), pp. 1237-1238.

* cited by examiner

METHOD FOR CALCULATING AN OUTPUT OF A NEURAL NETWORK

FIELD OF THE INVENTION

The present invention relates to a method and a device for calculating an output of a neural network.

BACKGROUND INFORMATION

The publication M. Courbariaux, Y. Bengio and J.-P David, "BinaryConnect: Training Deep Neural Networks with Binary Weights During Propagations" in 29th Annual Conference on Neural Information Processing Systems, Montreal, Canada, 2015 describes a method, in which the highly precise edge weights of an artificial neural network, resolved for example, with 32 bit floating point precision, are projected for each training step onto binary weighting factors, which may assume the values +1 and −1 in order to accelerate the training process through complexity reduction with the aid of additions and subtractions instead of multiplications.

The publication DE 44 049 74 C1 relates to a method that enables an installed hardware circuit to implement a neural network. The method is characterized in that the complex arithmetic operations required in the phases of the network that have been implemented by programming a general-purpose computer, are replaced by stochastic calculation methods.

The publication DE 103 17 384 A1 relates to a method of the computer tomography. An on-line reconstruction of tomographic images may also be achieved using an approach based on or similar to the Robbins-Monro algorithm.

The publication U.S. Pat. No. 5,926,804 A relates to a neural network and a method for training the neural network. The network includes a set of hidden nodes that include associated weights.

The publication U.S. Pat. No. 6,064,997 relates to a family of new multilayer discrete time controllers of neural networks for controlling a dynamic, multiple input multiple output system (MIMO system). No learning phase is required.

SUMMARY OF THE INVENTION

The gradient-based adaptations of the edge weights are calculated using the binarized edge weights, but applied to high precision edge weights. When subsequently using the network with the edge weights trained in this manner, it is possible to carry out a projection onto binarized edge weights as well. In the process, a comparatively minimal degradation of the classification accuracy is achieved in contrast to networks, which are trained and subsequently binarized using other training methods.

The binarized edge weights require 32 times less memory as compared to edge weights in 32-bit floating point format, which ensures advantages with respect to memory requirement, power consumption and execution speed when implementing these networks on special hardware. An imaging method for projecting edge weights includes a clipping to a particular interval, which is followed by stochastic rounding. Stochastic rounding or projecting in this case means that a value is rounded to the next closest whole number with a probability that is a function of the distance to this number. With converse probability, the number is rounded to the next whole number in the opposite direction.

Stochastically discretized edge weights may be used at the execution time of the trained network by initially generating multiple various networks by stochastic rounding of the edge weights and by subsequently using these as an ensemble for a classification.

A first aspect relates to a method for calculating an output of a neural network, including the steps of generating a first neural network that includes discrete edge weights from a neural network that includes precise edge weights by stochastic rounding; of generating a second neural network that includes discrete edge weights from the neural network that includes precise edge weights by stochastic rounding; and of calculating an output by adding together the output of the first neural network and the output of the second neural network. A high-performance output that includes few calculation steps is achieved by the method. In addition, the performance may also be increased compared to a network that includes high-precision edge weights. In the step of adding, the individual results of the first neural network and second neural network are added together.

The method may be used, for example, in a control unit of a vehicle. The method is further suitable for use in a control unit of an at least semi-autonomously driving vehicle. The method may also be used in a control unit for controlling a planning method, a manufacturing method, a production method and/or a logistics method, in particular, in industry 4.0 applications. The method may also be used in a control unit of an electronic and/or electromechanical tool. The use of the method in one of the aforementioned control units has the advantage that a computing power required for the calculation steps carried out in the control unit may be reduced as a result. This saves both energy, as well as installation space.

In one technically advantageous specific embodiment of the method, intermediate results in the calculation of the first neural network are resorted to in the calculation of the output of the second neural network. This also yields the technical advantage, for example, that a calculation of the output of the second neural network is accelerated and the power consumption of the second calculation may be reduced. In the process, a targeted selection of intermediate results may be carried out, which arrive at the same intermediate result in the second calculation and are therefore redundant.

In another technically advantageous specific embodiment of the method, the precise edge weights are stochastically projected during a forward propagation onto the discrete edge weights of the first and/or second neural network. This yields, for example, the technical advantage that the neural networks that include discrete edge weights may be rapidly calculated in succession.

In another technically advantageous specific embodiment of the method, the precise edge weights are limited to a value range. This yields, for example, the technical advantage that the accuracy of the method is improved.

In another technically advantageous specific embodiment of the method, the output of the first neural network and/or of the second neural network is stored in a buffer memory. This yields, for example, the technical advantage that intermediate results of the first network are resorted to when calculating the second network and, thus, the calculation speed may be increased and the power requirement may be reduced.

In another technically advantageous specific embodiment of the method, the buffer memory is a RAM (random access memory) or cache memory of a processor or of a dedicated hardware accelerator. This yields, for example, the technical advantage that the calculation speed is increased and the power requirement is reduced.

In another technically advantageous specific embodiment of the method, the stochastic rounding is carried out with the aid of a multiplexer. This also yields, for example, the technical advantage that the calculation speed is increased, in addition, less hardware logic is required than in other rounding methods and the power requirement may be correspondingly reduced.

In another technically advantageous specific embodiment of the method, the multiplexer is formed by a hardware circuit. This also yields, for example, the technical advantage that the calculation speed is improved, in addition, less hardware logic is required than in other rounding methods and the power requirement may be correspondingly reduced.

In another technically advantageous specific embodiment of the method, merely the precise edge weights of preselected layers are projected onto discrete edge weights when generating the first neural network or the second neural network. This also yields, for example, the technical advantage that the neural networks that include the discrete edge weights may be generated more rapidly.

In another technically advantageous specific embodiment of the method, additional neural networks that include discrete edge weights are generated from the neural network that includes precise edge weights on the basis of an accuracy requirement of the output, and are taken into consideration when added up. This also yields, for example, the technical advantage that the accuracy of the output may be increased depending on the requirement.

A second aspect relates to a computer program, which may be loaded into the memory of a digital computer and includes software code sections, with which the method according to the first aspect may be carried out when the computer program runs on a computer. The same technical advantages are achieved with the computer program as are achieved with the method according to the first aspect.

A third aspect relates to a machine-readable memory medium, in which the computer program according to the second aspect is stored.

A fourth aspect relates to a device, which is configured to carry out the method according to the first aspect.

Exemplary embodiments of the present invention are depicted in the drawing and explained in greater detail in the following description.

DETAILED DESCRIPTION

Figure 1:
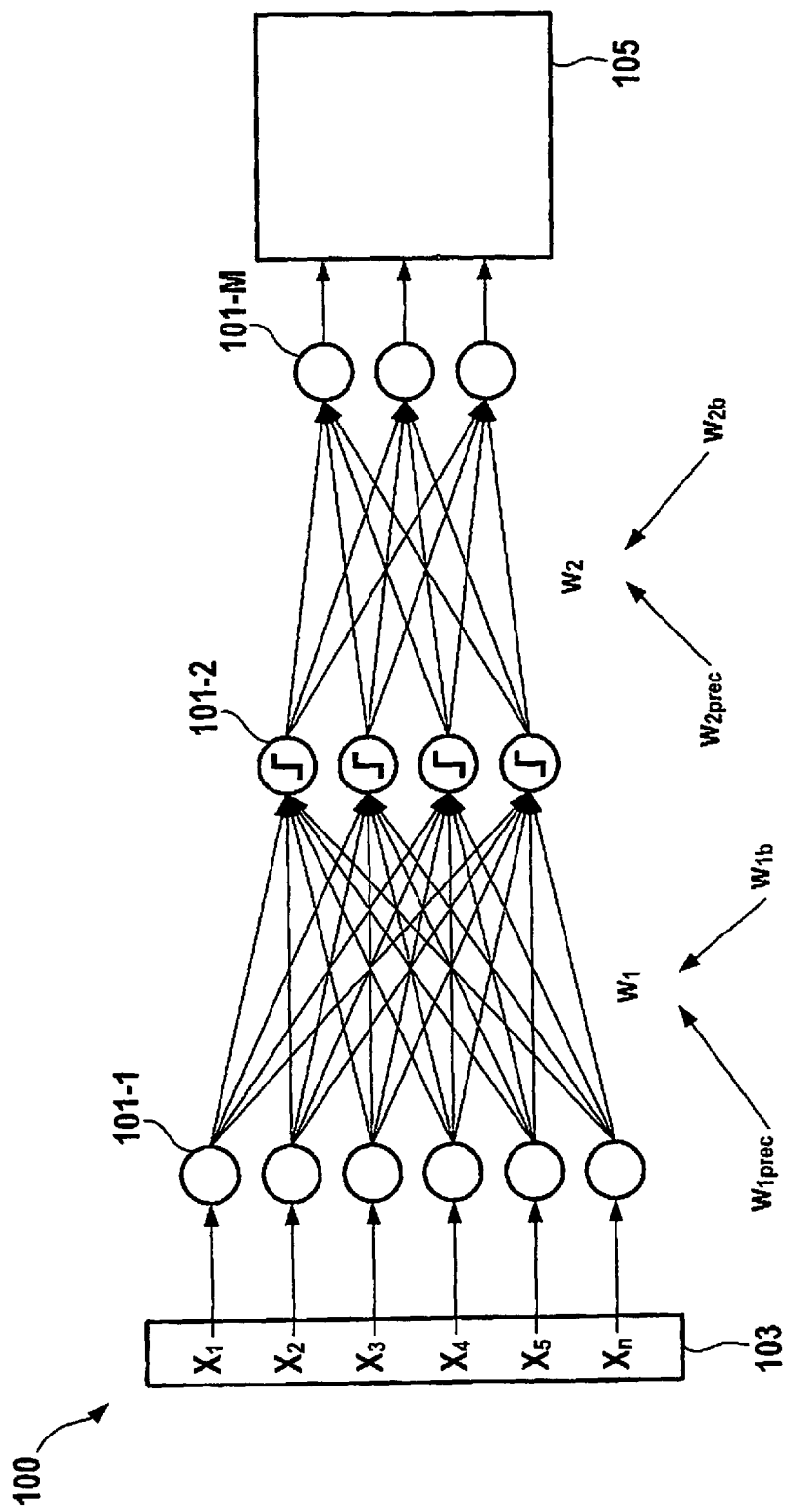
FIG. 1 shows a basic set-up of neural networks.

FIG. 1 shows a basic set-up of neural networks 100. Neural network 100 includes an input layer 101-1, one or multiple processing layers 101-2 (hidden layer) and an output layer 101-M. An input vector X is input as input data 103 into input layer 101-1 such as, for example, pixels of an image. Processing layers 101-2 act as neurons that have an activating function such as, for example, a threshold value (signum function), a hyperbolic tangent function, a sigmoid function or a ReLu function (ReLU—Rectified Linear Unit). The output of neural network 100 refers to the values of output layer 101-M, which may be used, for example, by selecting a maximum value for classifying the input data.

When forwarding input vector X to the following processing layer 101-2, the respective components of input vector X are multiplied by corresponding edge weights w. This also occurs with each forwarding to a following layer 101-M. The edge weights w of a layer 101-1, ..., 101-M are highly precise edge weights $w_{prec}$ such as, for example, floating point numbers, or stochastically projected values $w_b$ such as, for example, values rounded to a whole number. This forward processing of the input data by the neural network is referred to as forward propagation.

Neural networks 100 that include edge weights w in a highly precise form of presentation such as, for example, a 32-bit floating point form, provide a good performance in the sense of a low message error rate in output data 105. These neural networks 100 may be applied with the aid of a projection method to discrete values, such as, for example, +1 or −1, in discretized neural networks that include edge weights $w_b$. However, this downgrades the message failure rate of neural network 100.

Figure 2:
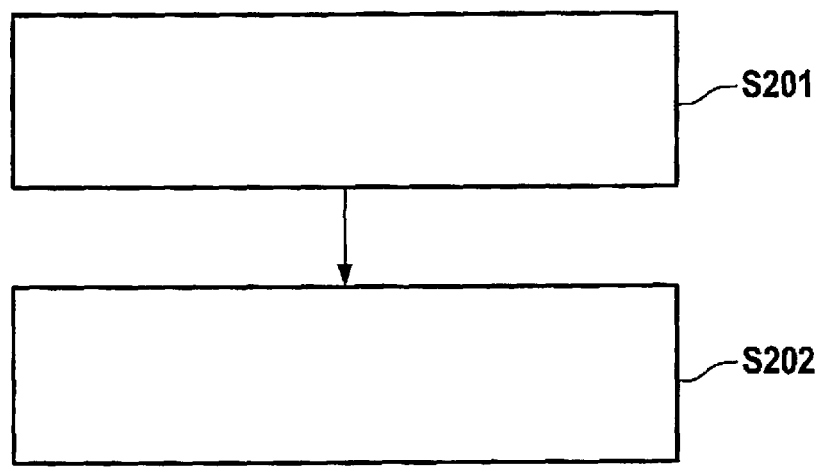
FIG. 2 shows a procedure according to which networks are generated.

FIG. 2 shows a procedure, with which neural networks 100 may be generated. In step S201, neural network 100 is initially trained with a value range limitation of the edge weights (clipping) and discretizing projection. In step S202, a neural network 100 that includes highly precise edge weights $w_{prec}$ is obtained as a result, which may be projected onto discrete values $w_b$ with low performance losses.

An imaging method for the projection of $w_{prec}$ onto $w_b$ is a clipping of $w_{prec}$ onto the interval [−1, +1], which is followed by stochastic rounding. Stochastic rounding in this case means that a value is rounded to the next closest whole number with a probability p, which is a function of the distance to this number. With the probability (1−p), the number is rounded to the next closest whole number in the opposite direction.

The indicated function sround(w) illustrates the stochastic rounding.

$$sround(w) = \begin{cases} \lceil w \rceil, & \text{where probability } p = \left|\frac{\lceil w \rceil - w}{\lceil w \rceil - \lfloor w \rfloor}\right| \\ \lfloor w \rfloor, & \text{where probability } 1 - p = \left|\frac{\lceil w \rceil - w}{\lceil w \rceil - \lfloor w \rfloor}\right| \end{cases}$$

The stochastic rounding may be used, for example, to binarize continuous values to two discrete values, as well as to project onto three or more values such as, for example, of [−1, +1] to −1, 0 and +1. In the following, therefore, mention is made of a discretization or quantization.

Figure 3:
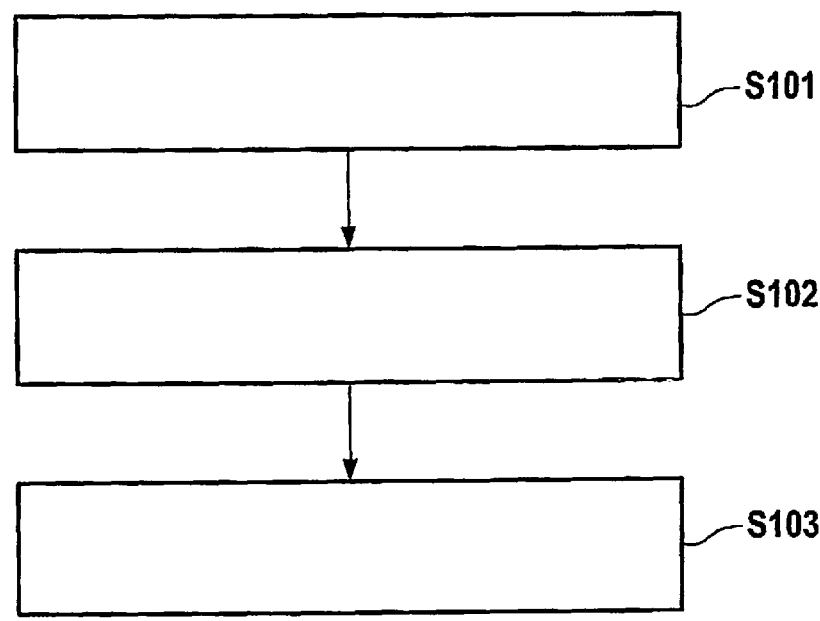
FIG. 3 shows a block diagram of a method for calculating the output.

FIG. 3 shows a block diagram of the method for calculating output 105 with the aid of neural network 100. The method includes step S101 of generating a first neural network that includes discrete edge weights $w_b$ from neural network 100 that includes precise edge weights $w_{prec}$ by stochastic rounding; and step S102 of generating a second neural network that includes discrete edge weights $w_b$ from neural network 100 that includes precise edge weights $w_{prec}$ by stochastic rounding. Subsequently, an output is calculated in step S103 by adding together the output of the first neural network and of the second neural network.

In general, additional neural networks that include discrete edge weights $w_b$ may also be generated, which are subsequently taken into consideration during the addition. In this way, an accuracy of the resulting output may be increased.

The method may be carried out by a device, which is configured to carry out the method steps. This device may, for example, be implemented in hardware or in software or in a mixed form, for example, in an application-specific integrated circuit (ASIC—Application-specific Integrated Circuit) or in a computer. Intermediate results in the calculation of the output of the first neural network may be buffered in a memory. These intermediate results may then be partially reused in the calculation of the output of the second neural network. This is the case, for example, if a calculation for the second neural network were to be based on the same discrete edge weights. As a result, a renewed performance of the arithmetic operations may be omitted and the speed may be improved and power consumption may be reduced. A reuse is also possible, for example, if the probability is low or equal to zero, that in a second calculation a value changes before an activation function, but the activation function will not propagate this change to additional processing layers. This is, in particular, the case with saturating activation functions such as, for example with the signum function, the hyperbolic tangent function, etc.

The stochastic rounding may be implemented in a hardware-engineered manner with the aid of pseudorandom number generators. By using N-to-1 bit multiplexers, it is possible to translate edge weights into bit streams. This makes it possible to stochastically round an edge weight, which is applied to an input of the multiplexer with a width of N bits, to zero or to one in one single clock step. A potential sign is directly transmitted, since it plays no role in the rounding operation. This method may be implemented, for example, with the aid of 8-to-1 multiplexers for 8-bit input bit widths. Thus, the method is suitable for the combination with discretized, trained networks.

Performance losses resulting from the form of representation of neural network 100 projected onto few quantized values may be overcompensated for with the method and, at the same time, the advantages of a strongly quantized network representation may be maintained. In addition, the present network topology may be flexibly addressed by preselection of the layers to be quantized.

Another technical advantage is that because of the type of processing of the neural network, output 105 of the network with the number of the stochastically discretized networks included in the addition becomes more reliable, i.e., is met with greater confidence.

For a non-critical application, for example, output 105 of neural network 100 may be used after only one processing step, whereas for critical applications, conclusions are not finally drawn or not drawn at all after just one processing step. The processing step in this case refers to the stochastic projection of precise edge weights $w_{prec}$ onto discrete values $w_b$ and the evaluation of input data 103 with the aid of neural network 100 with precisely these edge weights $w_b$.

Edge weights $w_{prec}$ of neural network 100 may be limited during the training to one interval or to a value range. In addition, precise edge weights $w_{prec}$ may be stochastically projected onto discrete values $v_b$ during training in a forward propagation within neural network 100. The gradients calculated during a back propagation, in turn, adapt the non-quantized, i.e., precise edge weights $w_{prec}$.

In one inference of neural networks 100, edge weights $w_{prec}$ are stochastically projected onto discrete values $w_b$, subsequently a forward propagation is carried out and an output of output layer 101-M, which in this case need not be a soft-max layer, is subsequently retained in a buffer memory. The buffer memory may, for example, be a RAM or cache memory of a processor.

The stochastic projection is then carried out again with a subsequent forward propagation and the new result is added to the result held in the buffer memory. If necessary, this procedure, which includes a stochastic projection, forward propagation and addition, is carried out multiple times or is carried out simultaneously with the aid of parallel processing units.

In order to establish under which conditions, how long accumulation and addition should take place, the performance of precise neural network 100 may be determined on a test dataset and the performance of the provided method may be evaluated for various accumulation lengths.

In an accumulation length of six, the method exceeds on average already the performance of precise neural network 100 with 32 bit floating point numbers positively. For purposes of implementation, the stochastic projection may be carried out already in advance and corresponding network weights $w_b$ are saved, which are then retrieved in succession or simultaneously during the inference and the results are added together.

One variant of the method includes only selected layers 101-M in the stochastic projection. This has the advantage that the specifications of network reduction and of the processing complexity minimization may be flexibly addressed and, at the same time, the performance requirements may be adhered to.

Figure 4:
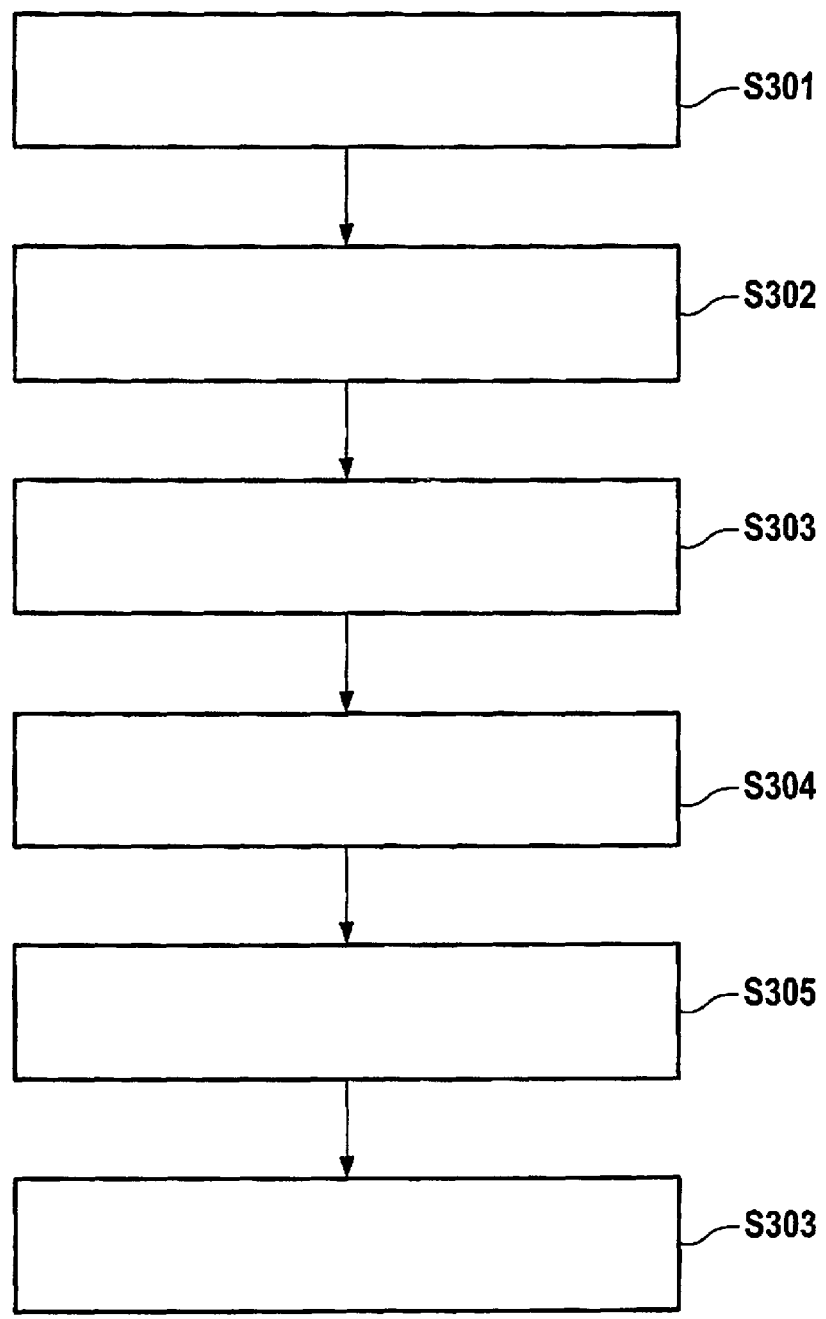
FIG. 4 shows a block diagram of a variant of the method.

FIG. 4 shows a block diagram of the method for calculating output 105 with the aid of neural network 100. The method includes step S301 of generating a first neural network that includes discrete edge weights $w_b$ from neural network 100 that includes precise edge weights $w_{prec}$ by stochastic rounding; step S302 of the forward propagation of input data 103 by the first neural network; step S303 of deciding which intermediate results may be reused in another calculation; step S304 of generating a second neural network that includes discrete edge weights $w_b$ from neural network 100 that includes precise edge weights $w_{prec}$ by stochastic rounding; and step S305 of the forward propagation of input data 103 by the second neural network, taking the intermediate results of the calculation of the first neural network into consideration. Subsequently, an output is calculated in step S306 by adding together the output of the first neural network and the output of the second neural network.

Figure 5:
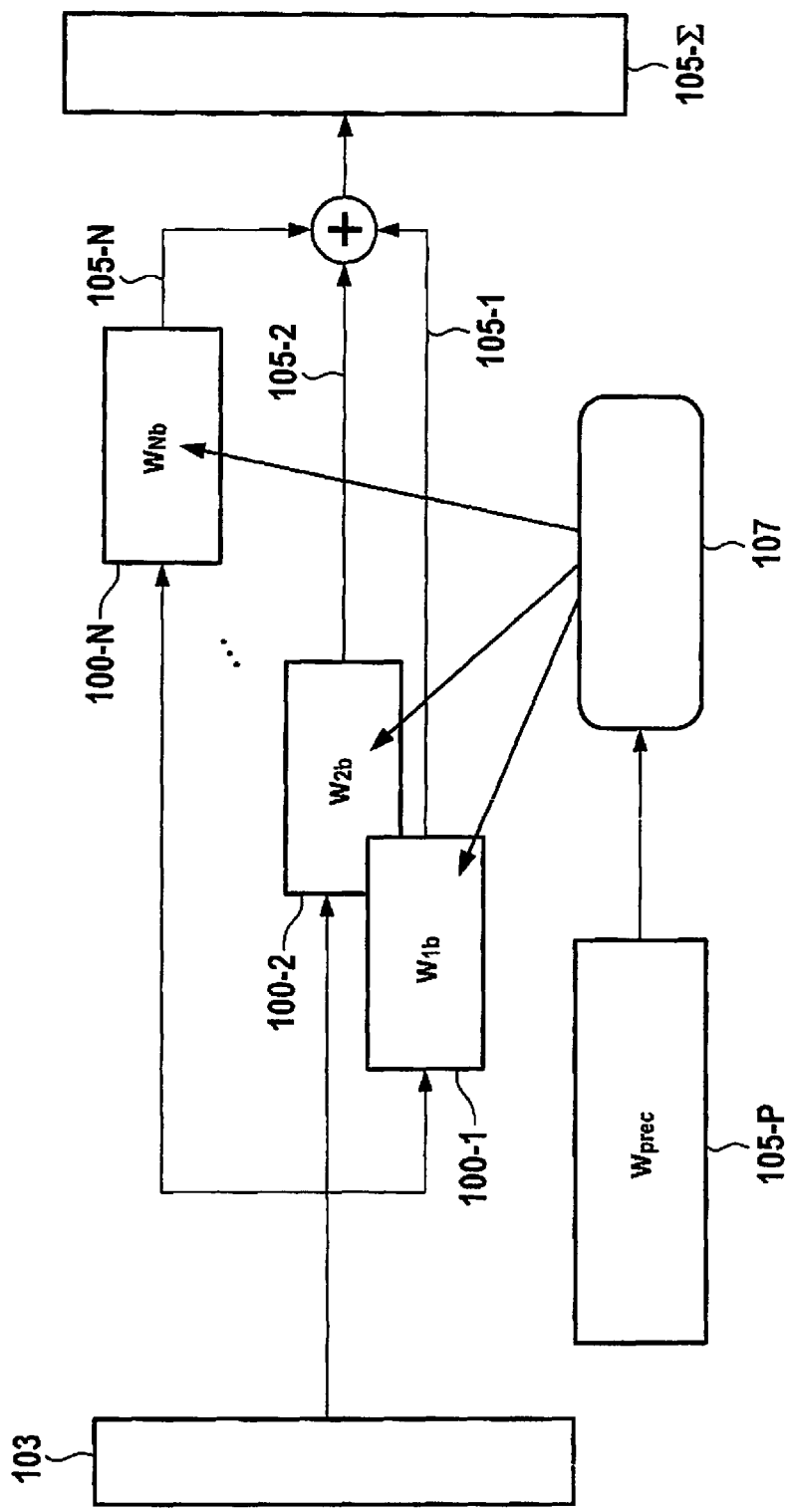
FIG. 5 shows a schematic view of the method.

FIG. 5 shows a schematic view of the method. Precise edge weights $w_{prec}$ of neural network 100-P are projected n-times by stochastic rounding 107 onto discrete edge weights $w_{xb}$. The generation of neural networks 100-1 through 100-N may be carried out in series or in parallel at one time. A number of neural networks 100-1, . . . , 100-N that include in part different discrete edge weights $w_{xb}$ are obtained as a result. Input data 103 are processed with neural networks 100-1, . . . , 100-N in output data 105-1, 105-2, . . . , 105-N.

The individual output data 105-$x$ of neural networks 100-1, . . . , 100-N obtained here are added together and considered as total output 105-Σ of neural network 100 in order, for example, to subsequently carry out a classification of input data 103.

Since the multiple stochastic projection and implementation of neural network 100 may be calculated successively or in parallel and with the same or with a different weighting, it is possible to flexibly address resource specifications such as, for example, real time limits and number and size of hardware accelerators. A performance loss is counteracted by the method while preserving the advantages resulting from the discretized, i.e. projected onto few values, representation of neural network 100 such as, for example, the avoidance of multiplications in edge weights, which are made up only of +1 and −1 or +1, −1 and 0.

Edge weights $w_{prec}$ of highly precise network 100-P in this method are ascertained by a training and thereafter fixed, i.e., are the same for all stochastic rounding steps. The edge weights of the quantized networks are distinguished by the stochastic character of the projection from $w_{prec}$ to $w_b$.

The method may be implemented by a computer program having software code sections, which may be loaded into the memory of a digital computer. The computer includes a memory for storing the computer program and additional data such as, for example, edge weights and the topology of neural network 100. One processor of the computer accesses the computer program stored in the memory and executes the computer program. However, the method may also be implemented by a suitable hardware circuit, for example, as a block in an application-specific integrated circuit. The computer program may be stored in digital form on a machine-readable memory medium such as, for example, on a compact disk or on a USB stick.

Figure 6:
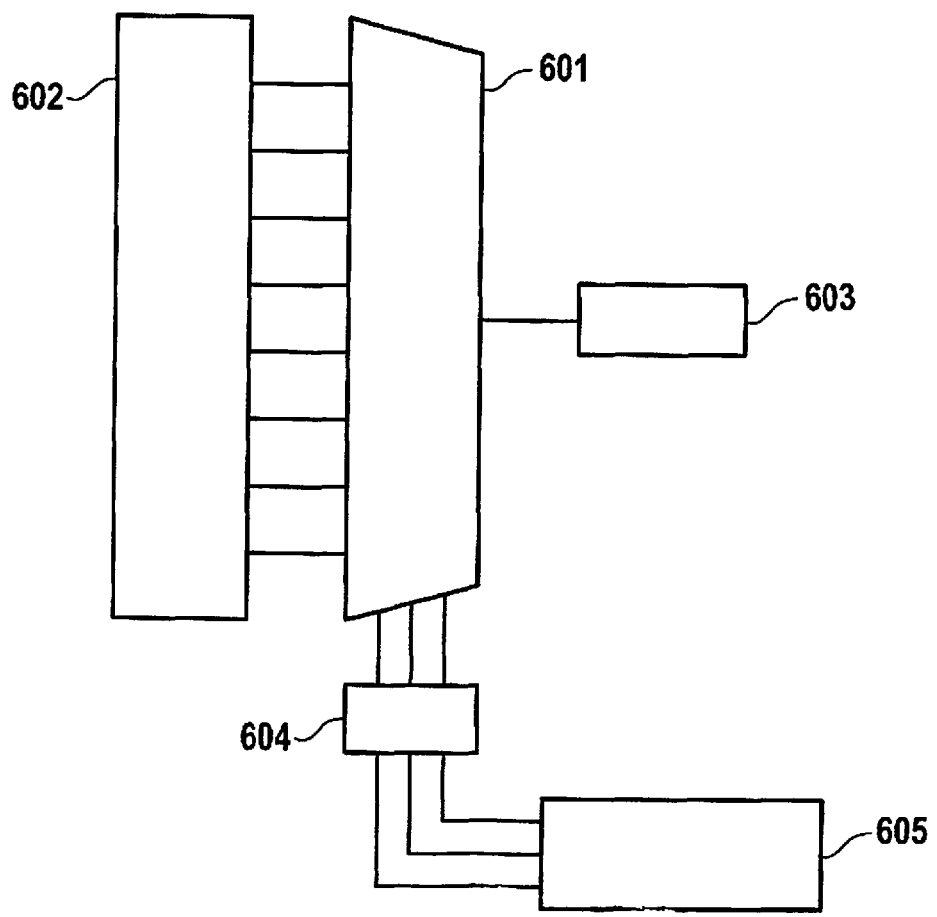
FIG. 6 shows a multiplexer, which is connected to a pseudorandom number generator for a hardware implementation of the stochastic rounding.

FIG. 6 schematically shows an 8-to-1 bit multiplexer 601, which sends a bit of an input bit vector 602 to output 603 as a function of a select signal 604 and thereby enables a hardware-engineered implementation of the stochastic rounding. If the input bit vector is understood to be a binary fixed point number $Z_b = 0.b_8 b_7 b_6 b_5 b_4 b_3 b_2 b_1$ having a highest value bit $b_8$ and a lowest value bit $b_1$, then a number Z in an interval [0,1] having a maximum quantization error of $2^{-8}$ may be represented as $Z_b$. If an input bit vector 602, which represents $Z_b$ and therefore Z, is applied to the multiplexer and a select signal 604 is selected in such a way that the probability of sending a bit $b_x$ from the input to the output out 603 is equal to $P(\text{out}=b_x)$:

$$P(\text{out} = b_x) = \frac{2^{x-1}}{2^8 - 1},$$

then output out 603 corresponds to a result of the stochastic rounding of the input bit vector, respectively, of the fixed point number $Z_b$ and thus enables an approximation for out=sround(Z).

A pseudorandom number generator 605 may be used to generate select signal 604 with selection probability $P(\text{out}=b_x)$. For example, this generator is configured for an 8-to-1 multiplexer in such a way that this generator supplies a 3-bit select signal $s_3 s_2 s_1$, each bit select line $s_y$ with the probability $P(s_y=1)$ being equal to 1:

$$P(s_y = 1) = \frac{2^{2^{y-1}}}{2^{2^{y-1}} + 1}.$$

According to prevalent convention, a select signal ($s_3 s_2 s_1$) "000" sends lowest value input bit $b_1$ to the output. The overall result, therefore, is the aforementioned selection probability $P(\text{out}=b_x)$ and, accordingly, the probability $P(\text{out}=1)$ is a direct function of the input vector and, therefore, of Z.

The scope of protection of the present invention is indicated by the claims and is not limited by the features explained in the description or shown in the figures.

What is claimed is:

1. A method using a base neural network having a set of base edge weights, the method comprising:
generating from the base neural network a first derivative neural network by performing a first stochastic rounding of the base edge weights so that the first derivative neural network has a first set of discrete edge weights;
generating from the base neural network a second derivative neural network by performing a second stochastic rounding of the base edge weights so that the second derivative neural network has a second set of discrete edge weights, wherein the first and second stochastic roundings differ from each other so that, with respect to each respective base edge weight of the set of base edge weights, the respective base edge weight corresponds to and differs from a respective discrete edge weight of the first set, the respective base edge weight corresponds to and differs from a respective discrete edge weight of the second set, and the respective discrete edge weight of the first set and the respective discrete edge weight of the second set to which the respective base edge weight corresponds differ from each other;
inputting input data into the first derivative neural network so that the first derivative neural network thereby generates first output data from the input data using the first set of discrete edge weights;
inputting the input data into the second derivative neural network so that the second derivative neural network thereby generates second output data from the input data using the second set of discrete edge weights; and
calculating an output by adding together the first output data obtained from the first derivative neural network and the second output data obtained from the second derivative neural network.

2. The method of claim 1, wherein in a calculation of the output data of the second derivative neural network, intermediate results are used which are obtained by the calculation of the first derivative neural network.

3. The method of claim 1, wherein the output data of the first derivative neural network and/or of the second derivative neural network is stored in a buffer memory.

4. The method of claim 3, wherein the buffer memory is a RAM or cache memory of a processor or of a dedicated hardware accelerator.

5. The method of claim 1, wherein the stochastic rounding is performed with a multiplexer.

6. The method of claim 5, wherein the multiplexer includes a hardware circuit.

7. The method of claim 1, wherein the base edge weights of the base neural network which are subjected to the first and second stochastic roundings are of preselected layers of the base neural network, and the base neural network includes additional base edge weights of other layers of the base neural network which (a) are not subjected to the first stochastic rounding, (b) are not subjected to the second stochastic rounding, and (c) are used in corresponding layers of the first and second derivative neural networks.

8. The method of claim 1, wherein additional derivative neural networks that include a set of discrete edge weights are generated from the base neural network based on an accuracy requirement of the output and are used to produce further output data that are added to the first and second output data to produce the output.

9. The method of claim 1, wherein the method is performed by at least one of:
- a control unit of a vehicle;
- a control unit for controlling a planning method, a manufacturing method, a production method and/or a logistics method; and/or
- a control unit of an electronic and/or electromechanical tool.

10. The method of claim 1, wherein the first and second stochastic roundings are implemented by a multiplexer that modifies the different roundings by random number generation.

11. A non-transitory computer readable medium having a computer program, which is executable by a digital computer, the computer program comprising program code that, when executed by the digital computer, causes the digital computer to perform a method that uses a base neural network having a set of base edge weights, the method comprising:
- generating from the base neural network a first derivative neural network by performing a first stochastic rounding of the base edge weights so that the first derivative neural network has a first set of discrete edge weights;
- generating from the base neural network a second derivative neural network by performing a second stochastic rounding of the base edge weights so that the second derivative neural network has a second set of discrete edge weights, wherein the first and second stochastic roundings differ from each other so that, with respect to each respective base edge weight of the set of base edge weights, the respective base edge weight corresponds to and differs from a respective discrete edge weight of the first set, the respective base edge weight corresponds to and differs from a respective discrete edge weight of the second set, and the respective discrete edge weight of the first set and the respective discrete edge weight of the second set to which the respective base edge weight corresponds differ from each other;
- inputting input data into the first derivative neural network so that the first derivative neural network thereby generates first output data from the input data using the first set of discrete edge weights;
- inputting the input data into the second derivative neural network so that the second derivative neural network thereby generates second output data from the input data using the second set of discrete edge weights; and
- calculating an output by adding together the first output data obtained from the first derivative neural network and the second output data obtained from the second derivative neural network.

12. The computer readable medium of claim 11, wherein in a calculation of the output data of the second derivative neural network, intermediate results are used which are obtained by the calculation of the first derivative neural network.

13. A device comprising a processing apparatus configured to perform a method using a base neural network having a set of base edge weights, the method comprising:
- generating from the base neural network a first derivative neural network by performing a first stochastic rounding of the base edge weights so that the first derivative neural network has a first set of includes discrete edge weights;
- generating from the base neural network a second derivative neural network by performing a second stochastic rounding of the base edge weights so that the second derivative neural network has a second set of discrete edge weights, wherein the first and second stochastic roundings differ from each other so that, with respect to each respective base edge weight of the set of base edge weights, the respective base edge weight corresponds to and differs from a respective discrete edge weight of the first set, the respective base edge weight corresponds to and differs from a respective discrete edge weight of the second set, and the respective discrete edge weight of the first set and the respective discrete edge weight of the second set to which the respective base edge weight corresponds differ from each other;
- inputting input data into the first derivative neural network so that the first derivative neural network thereby generates first output data from the input data using the first set of discrete edge weights;
- inputting the input data into the second derivative neural network so that the second derivative neural network thereby generates second output data from the input data using the second set of discrete edge weights; and
- calculating an output by adding together the first output data obtained from the first derivative neural network and the second output data obtained from the second derivative neural network.

* * * * *